(No Model.)
M. W. DEWEY.
METHOD OF ELECTRIC REFRIGERATION.
No. 420,641. Patented Feb. 4, 1890.
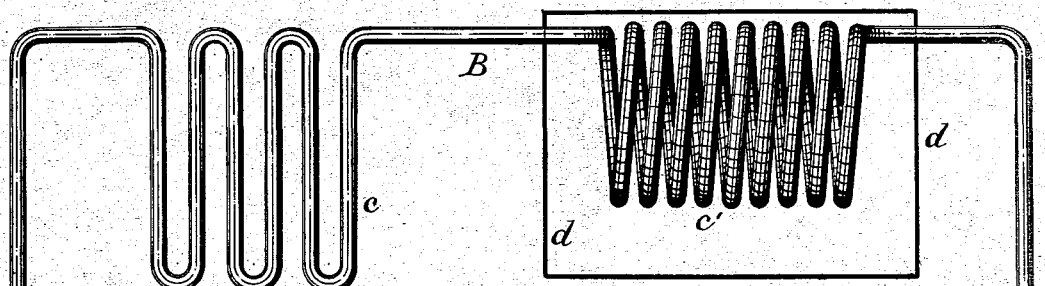
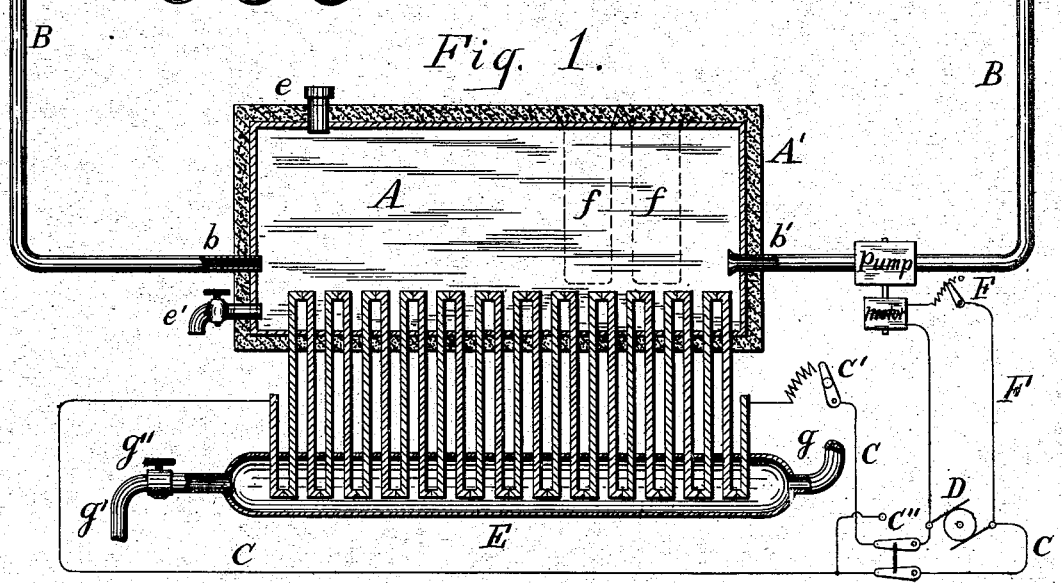
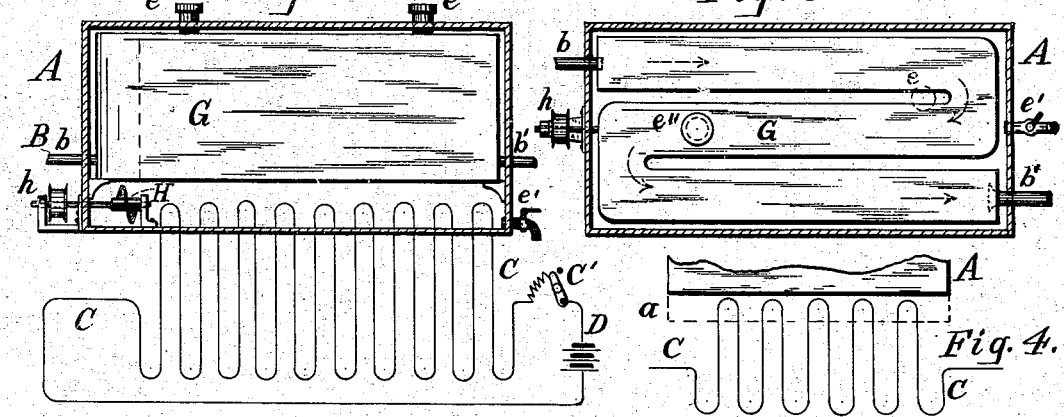
WITNESSES:
J. J. Laass.
C. L. Bendixon.
INVENTOR,
Mark W. Dewey
BY
Duell, Laass & Duell
his ATTORNEYS.

UNITED STATES PATENT OFFICE.

MARK W. DEWEY, OF SYRACUSE, NEW YORK, ASSIGNOR TO THE DEWEY CORPORATION, OF SAME PLACE.

METHOD OF ELECTRIC REFRIGERATION.

SPECIFICATION forming part of Letters Patent No. 420,641, dated February 4, 1890.

Application filed November 15, 1889. Serial No. 330,462. (No model.)

*To all whom it may concern:*

Be it known that I, MARK W. DEWEY, of Syracuse, in the county of Onondaga, in the State of New York, have invented new and useful Improvements in Methods of Electric Refrigeration, of which the following, taken in connection with the accompanying drawings, is a full, clear, and exact description.

My invention relates to a new and improved method for producing cold or removing heat, to cool, produce ice, or change the temperature in desired localities, and is similar in some respects to my method of electric refrigeration set forth in United States Letters Patent issued October 15, 1889, No. 413,136.

The main object of my present invention is to distribute cold produced by electricity in a certain locality to or through one or more localities remote from that where the cold is produced.

My invention is designed particularly for use in breweries, packing-houses, and cold-storage depots; but it will be obvious that the same may be used for cooling purposes of all kinds, or for effecting any desired change in temperature.

My invention consists in establishing an electric circuit having one or more parts adapted to be cooled and one or more parts adapted to be heated by the current, locating said part or parts cooled within or in contact with a receptacle containing an uncongealable medium, agitating said uncongealable medium, locating a second receptacle having a tortuous passage and containing an uncongealable medium in proximity to said cooled part or parts and in contact with the uncongealable medium in the former receptacle and circulating the medium contained in the second receptacle in a conduit or pipe leading to or through a humid locality to be cooled, and diffusing, dissipating, or conducting the heat from the heated part or parts of the circuit by locating the latter part or parts within or in contact with a conduit and passing a current of water through the conduit.

To this end my invention consists, essentially, in subjecting a medium to a temperature-changing effect produced by an electric current in one or more parts of an electric circuit and in circulating said medium through a conduit or pipe leading to or through a locality wherein the temperature is to be changed.

My invention further consists in certain combinations of steps of the method, as will be hereinafter described, and pointed out in the claims.

In the accompanying drawings, Figure 1 represents a general view of apparatus for accomplishing my method or for accomplishing certain steps in the method. Figs. 2 and 3 show a tortuous receptacle within another containing an agitator; and Fig. 4 shows the parts or junctions to be cooled in proximity to a receptacle, but not within or in contact with the same.

Referring specifically to the drawings, A in Fig. 1 represents a section of a receptacle or refrigeratory to be cooled. A' is an envelope of heat-non-conducting material inclosing the same. B is a conduit or pipe leading from the receptacle at b and returning to the same at b'. The pipe B leads to or through several localities to be cooled or to have the temperature changed therein. A tortuous passage is formed by the pipe at two different locations—c and c'. The tortuous passage at c is formed by serpentinely-shaping the pipe and at c' by coiling said pipe. The latter locality is indicated more particularly by a line d, inclosing the coil. The line d indicates the walls of a receptacle, vault, or room, which may be isolated from the external temperature in any suitable and well-known manner to prevent the conduction of heat thereto. The pipe or the tortuous parts therof may be arranged in any desired manner at the localities to be cooled; but I prefer to arrange them in most cases overhead or alongide the walls.

The cooling at the distant localities c and c' is effected by circulating, distributing, or forcing through the pipe B by means of a suitable pump a medium, preferably an uncongeable liquid, after the latter has been subjected to the cooling effect of an electric current. The circulatory apparatus cools the surrounding air in the rooms, cellars, or other localities, and as the hot air always tends to ascend to the ceiling it comes in contact with the cold coils, becomes cooled, and leaves upon the coils, in cases when said coils are very cold, the humidity in the form of rime, thus obtaining in the entire room a temperature equal to that of an air cold and dry. The principal advantage of this system is the great saving in manual labor, as there is no carrying of ice to be done.

The medium contained in the reservoir and circulated in the pipe B may be a solution of chloride of calcium, magnesium, or sodium, but in some cases simply water or air.

$e$ is the inlet or nozzle for admitting the solution, and $e'$ is the outlet for removing the solution from the reservoir. Molds $f\,f$ for forming blocks of ice are indicated in dotted lines within the said reservoir.

The apparatus for cooling the medium hereinbefore referred to may be the same or similar to that described and shown in my prior patent above referred to, and for that reason I shall not describe the same herein minutely, but will proceed to point out and describe the improvements connected therewith.

C is the electric circuit having parts adapted to be cooled and other parts adapted to be heated by the current from a suitable source of electricity D. The device shown in the drawings for accomplishing the change of temperature in the parts of the circuit C is, for the sake of simplicity, an ordinary thermopile; but I do not limit myself to this construction, as before mentioned. The source of electricity is connected to said pile, so that the parts cooled will be those located within the receptacle or reservoir A, and the parts heated will be those located within the cooling conduit or pipe E.

$g$ indicates the pipe for connecting the conduit E with a suitable head of cool water. $g'$ is the outlet-pipe for said conduit, and $g''$ is a regulating-cock in the outlet-pipe for regulating the flow of water through the conduit.

$C'$ is an adjustable resistance in the circuit C to regulate the current therein, and $C''$ is a current-reverser to reverse the location of the cooled and heated parts for the purpose of heating a medium to be circulated instead of cooling the same. Said current-reverser may be dispensed with when it is not desired to effect either or both operations with the same apparatus. Another circuit F leads from the dynamo D to an electric motor for working the pump located in the pipe B, and contains a suitable current-regulating device $F'$ in the shape of an adjustable resistance.

Part of the operation of the apparatus, briefly, is as follows: The electric current produces, by means of the thermopile or other device, a convection or conduction of heat from the receptacle and the medium or solution contained therein through the bars of the pile or parts forming the circuit between the receptacle A and conduit E, and deposits the heat thus removed in the parts of the circuit located in the conduit E, where it seeks to become disengaged or released. The cool water permitted to flow through the said conduit disengages, diffuses, dissipates, or conducts the heat from the heated parts therein and carries it away. This operation is continuous and simultaneous therewith. The medium in the receptacle cooled is circulated or forced through the localities to be cooled by means of the pump and motor.

Referring to Figs. 2 and 3 of the drawings, A represents two sectional views of a receptacle containing the cooled parts of the circuit C and an uncongealable medium; but in this case the medium in this receptacle is not circulated through the pipe B. Another receptacle G, preferably a tortuous one, as shown, is located within the receptacle A and contains the medium to be circulated through said pipe, and is connected with the terminals of the same for that purpose. The nozzle $e''$ is provided for introducing the medium to the inner receptacle. This receptacle or tank G is given a winding shape, in order to retain the solution therein a longer period of time or to insure a more thorough and equal change of its temperature between its reception and discharge. To still further insure this change of temperature, a stirring-helix H is provided within the lower part of the receptacle A to stir or agitate the medium therein to equalize its temperature in all parts of the tank.

$h$ is the pulley of the helix, which may be turned by a belt connecting the same with a pulley on the shaft of the electric motor operating the pump, or said helix may be operated by any suitable means. The pump for circulating the medium through the pipe may be a double-acting one, if desired, and worked by any suitable and convenient means.

The receptacle A in Figs. 2 and 3 may be enveloped in insulating material the same as the receptacle in Fig. 1. In some cases the pipe B may be covered with a non-heat-conducting substance between the receptacle or reservoir and the locality to be cooled to prevent the absorption of heat thereby; but the pipe is bare at said locality. In some cases the tortuous receptacle may be formed of a serpentinely shaped or coiled pipe having a great many folds or convolutions.

Fig. 4 represents the receptacle A in close proximity to the cooled parts or junctions of the thermopile, but not in contact therewith. While this latter plan is not as effective as when said parts are within or in contact with the receptacle, it may be employed in some cases with good results, especially when a good conductor of heat is interposed between the parts and the receptacle, or when a good non-heat-conducting substance incloses said parts, to confine the temperature produced by the parts to the portion of the receptacle in proximity thereto, as indicated by the dotted line $a$ in the figure.

As I contemplate employing any or all of the devices shown and described in my prior patent above referred to to accomplish the method herein described, I do not limit myself to the devices which are shown and described herein.

It will be evident that many changes in the construction and relative arrangement of parts may be resorted to, and also variations may be made in the method, without departing from the spirit and scope of my invention; and I would have it understood that I do not limit myself to the particular construction, arrangement of parts shown, or to the precise or exact method herein described.

Having described my invention, what I claim as new, and desire to secure by Letters Patent, is—

1. The method of electric cooling or freezing, consisting in establishing an electric circuit having one or more parts adapted to be cooled by the current, subjecting a medium to the cooling effect of said part or parts, and circulating or distributing the said medium through a conduit or pipe leading to or through a locality to be cooled.

2. The method of electric cooling or freezing, consisting in establishing an electric circuit having one or more parts adapted to be cooled by the current, subjecting an uncongealable medium to the cooling effect of said part or parts, and circulating the said medium in a conduit or pipe leading to or through a locality to be cooled.

3. The method of electric cooling or freezing, consisting in establishing an electric circuit having one or more parts adapted to be cooled by the current, subjecting an uncongealable medium to the cooling effect of said part or parts, and simultaneously therewith circulating the said medium in a conduit or pipe leading to or through a locality to be cooled.

4. The method of electric cooling or freezing, consisting in establishing an electric circuit having one or more parts adapted to be cooled by the current, subjecting an uncongealable medium to the cooling effect of said part or parts, and circulating the said medium in a conduit or pipe leading to or through a humid locality to be cooled.

5. The method of electric cooling or freezing, consisting in establishing an electric circuit having one or more parts adapted to be cooled by the current, subjecting an uncongealable medium contained in a receptacle or reservoir to the cooling effect of said part or parts, and circulating the said medium in a conduit or pipe leading from and to the reservoir and through the locality whereat the temperature is to be changed.

6. The method of electric cooling or freezing, consisting in establishing an electric circuit having one or more parts adapted to be cooled by the current, subjecting an uncongealable medium contained in a non-heat-conducting receptacle or reservoir to the cooling effect of said part or parts, and circulating the said medium in a conduit or pipe leading from and to the reservoir and through the locality whereat the temperature is to be changed.

7. The method of electric cooling or freezing, consisting in establishing an electric circuit having one or more parts adapted to be cooled by the current, subjecting an uncongealable liquid contained in a receptacle or reservoir to the cooling effect of said part or parts, and circulating the said liquid in a conduit or pipe leading from and to the reservoir and through the locality whereat the temperature is to be changed.

8. The method of electric cooling or freezing, consisting in establishing an electric circuit having one or more parts adapted to be cooled by the current, subjecting an uncongealable medium to the cooling effect of said part or parts, and circulating the said medium in a conduit or pipe leading to or through a receptacle or room containing humid air to be cooled.

9. The method of electric cooling or freezing, consisting in establishing an electric circuit having one or more parts adapted to be cooled by the current, subjecting an uncongealable medium to the cooling effect of said part or parts, and forcing the said medium through a conduit or pipe leading to or through a locality to be cooled.

10. The method of electric cooling or freezing, consisting in establishing an electric circuit having one or more parts adapted to be cooled by the current, locating said parts or parts within or in contact with a receptacle containing an uncongealable medium, locating a second receptacle containing a medium in proximity to said part or parts and in contact with the said uncongealable medium, and circulating the medium contained in the second receptacle in a conduit or pipe leading to or through a locality to be cooled.

11. The method of electric cooling or freezing, consisting in establishing an electric circuit having one or more parts adapted to be cooled by the current, locating said part or parts within or in contact with a receptacle containing an uncongealable medium, agitating said uncongealable medium, locating a second receptacle containing a medium in proximity to said part or parts and in contact with the said uncongealable medium, and circulating the medium contained in the second receptacle in a conduit or pipe leading to or through a locality to be cooled.

12. The method of electric cooling or freezing, consisting in establishing an electric circuit having one or more parts adapted to be cooled by the current, locating said part or parts within or in contact with a receptacle containing an uncongealable medium, agitating said uncongealable medium, locating a second receptacle having a tortuous passage and containing a medium in proximity to said part or parts and in contact with the said uncongealable medium, and circulating the medium contained in the second receptacle in a conduit or pipe leading to or through a locality to be cooled.

13. The method of electric cooling or freezing, consisting in establishing an electric circuit having one or more parts adapted to be cooled by the current, locating said part or parts within or in contact with a receptacle containing an uncongealable medium, locating a second receptacle containing an uncongealable medium in proximity to said part or parts and in contact with the uncongealable medium in the former receptacle, and circulating the medium contained in the second receptacle in a conduit or pipe leading to or through a locality to be cooled.

14. The method of electric cooling or freezing, consisting in establishing an electric circuit having one or more parts adapted to be cooled by the current, locating said part or parts within or in contact with a receptacle containing an uncongealable medium, subjecting a second receptacle containing a medium to the cooling effect of the uncongealable medium in the former receptacle, and circulating the medium contained in the second receptacle in a conduit or pipe leading to or through a locality to be cooled.

15. The method of electric cooling or freezing, consisting in establishing an electric circuit having one or more parts adapted to be cooled by the current, locating said part or parts within or in contact with a receptacle containing an uncongealable medium, locating a second receptacle containing a medium within the former receptacle, and circulating the medium contained in the second receptacle in a conduit or pipe leading to or through a locality to be cooled.

16. The method of electric cooling or freezing, consisting in establishing an electric circuit having one or more parts adapted to be cooled by the current, locating said part or parts within or in contact with a receptacle containing an uncongealable medium, subjecting a second receptacle containing a medium to the cooling effect of the uncongealable medium in the former receptacle, and circulating the medium contained in the second receptacle through a tortuous passage or coiled pipe located in a locality to be cooled.

17. The method of electric cooling or freezing, consisting in establishing an electric circuit having one or more parts adapted to be cooled and one or more parts adapted to be heated by the current, subjecting a medium to the cooling effect of said part or parts cooled, and circulating or distributing the said medium through a conduit or pipe leading to or through a locality to be cooled, and diffusing, dissipating, or conducting the heat from the heated part or parts of the circuit.

18. The method of electric cooling or freezing, consisting in establishing an electric circuit having one or more parts adapted to be cooled and one or more parts adapted to be heated by the current, subjecting an uncongealable medium to the cooling effect of said part or parts cooled, and circulating the said medium in a conduit or pipe leading to or through a locality to be cooled, and diffusing, dissipating, or conducting the heat from the heated part or parts of the circuit.

19. The method of electric cooling or freezing, consisting in establishing an electric circuit having one or more parts adapted to be cooled and one or more parts adapted to be heated by the current, subjecting an uncongealable medium to the cooling effect of said part or parts cooled, and circulating the said medium in a conduit or pipe leading to or through a humid locality to be cooled, and diffusing, dissipating, or conducting the heat from the heated part or parts of the circuit.

20. The method of electric cooling or freezing, consisting in establishing an electric circuit having one or more parts adapted to be cooled and one or more parts adapted to be heated by the current, subjecting an uncongealable medium contained in a non-heat-conducting receptacle or reservoir to the cooling effect of said part or parts cooled, and circulating the said medium in a conduit or pipe leading from and to the reservoir and through the locality whereat the temperature is to be cooled, and diffusing, dissipating, or conducting the heat from the heated part or parts of the circuit.

21. The method of electric cooling or freezing, consisting in establishing an electric circuit having one or more parts adapted to be cooled and one or more parts adapted to be heated by the current, subjecting an uncongealable medium to the cooling effect of said part or parts cooled, and forcing the said medium through a conduit or pipe leading to or through a locality to be cooled, and diffusing, dissipating, or conducting the heat from the heated part or parts of the circuit.

22. The method of electric cooling or freezing, consisting in establishing an electric circuit having one or more parts adapted to be cooled and one or more parts adapted to be heated by the current, locating said part or parts to be cooled within or in contact with a receptacle containing an uncongealable medium, locating a second receptacle containing a medium in proximity to said part or parts cooled and in contact with the said uncongealable medium, and circulating the medium contained in the second receptacle in a conduit or pipe leading to or through a locality to be cooled, and diffusing, dissipating, or conducting the heat from the heated part or parts of the circuit.

23. The method of electric cooling or freezing, consisting in establishing an electric circuit having one or more parts adapted to be cooled and one or more parts adapted to be heated by the current, locating said cooled part or parts within or in contact with a receptacle containing an uncongealable medium, agitating said uncongealable medium, locating a second receptacle containing a medium in proximity to said part or parts cooled and in contact with the said uncongealable medium, and circulating the medium contained in the second receptacle in a conduit or pipe leading to or through a locality to be cooled, and diffusing, dissipating, or conducting the heat from the heated part or parts of the circuit.

24. The method of electric cooling or freezing, consisting in establishing an electric circuit having one or more parts adapted to be cooled and one or more parts adapted to be heated by the current, locating said part or parts cooled within or in contact with a receptacle containing an uncongealable medium, agitating said uncongealable medium, locating a second receptacle having a tortuous passage and containing a medium in proximity to said part or parts cooled and in contact with the said uncongealable medium, and circulating the medium contained in the second receptacle in a conduit or pipe leading to or through a locality to be cooled, and diffusing, dissipating, or conducting the heat from the heated part or parts of the circuit.

25. The method of electric cooling or freezing, consisting in establishing an electric circuit having one or more parts adapted to be cooled and one or more parts adapted to be heated by the current, locating said part or parts cooled within or in contact with a receptacle containing an uncongealable medium, subjecting a second receptacle containing a medium to the cooling effect of the uncongealable medium in the former receptacle, and circulating the medium contained in the second receptacle in a conduit or pipe leading to or through a locality to be cooled, and diffusing, dissipating, or conducting the heat from the heated part or parts of the circuit.

26. The method of electric cooling or freezing, consisting in establishing an electric circuit having one or more parts adapted to be cooled and one or more parts adapted to be heated by the current, locating said part or parts cooled within or in contact with a receptacle containing an uncongealable medium, locating a second receptacle containing a medium within the former receptacle, and circulating the medium contained in the second receptacle in a conduit or pipe leading to or through a locality to be cooled, and diffusing, dissipating, or conducting the heat from the heated part or parts of the circuit.

27. The method of electric cooling or freezing, consisting in establishing an electric circuit having one or more parts adapted to be cooled and one or more parts adapted to be heated by the current, subjecting a medium to the cooling effect of said part or parts cooled, and circulating or distributing the said medium through a conduit or pipe leading to or through a locality to be cooled, and diffusing, dissipating, or conducting the heat from the heated part or parts of the circuit by locating said heated part or parts within or in contact with a conduit and passing a current of water through the conduit.

28. The method of electric cooling or freezing, consisting in establishing an electric circuit having one or more parts adapted to be cooled and one or more parts adapted to be heated by the current, locating said part or parts cooled within or in contact with a receptacle containing an uncongealable medium, subjecting a second receptacle containing a medium to the cooling effect of the uncongealable medium in the former receptacle, and circulating the medium contained in the second receptacle in a conduit or pipe leading to or through a locality to be cooled, and diffusing, dissipating, or conducting the heat from the heated part or parts of the circuit by locating said heated part or parts within or in contact with a conduit and passing a current of cool water through the conduit.

29. The method of electric cooling or freezing, consisting in establishing an electric circuit having one or more parts adapted to be cooled and one or more parts adapted to be heated by the current, locating said part or parts cooled within or in contact with a receptacle containing an uncongealable medium, locating a second receptable containing a medium within the former receptacle, and circulating the medium contained in the second receptacle in a conduit or pipe leading to or through a locality to be cooled, and diffusing, dissipating, or conducting the heat from the heated part or parts of the circuit by locating said heated part or parts within or in contact with a conduit and passing a current of cool water through the conduit.

30. The method of electric cooling or freezing, consisting in establishing an electric circuit having one or more parts adapted to be cooled and one or more parts adapted to be heated by the current, locating the part or parts adapted to be cooled in proximity to a receptacle to be cooled, and diffusing, dissipating, or conducting the heat from the heated part or parts of the circuit.

31. The method of electric cooling or freezing, consisting in establishing an electric circuit having one or more parts adapted to be cooled and one or more parts adapted to be heated by the electric current, locating the part or parts adapted to be cooled in proximity to a receptacle to be cooled, inclosing the said receptacle and cooled part or parts in an envelope of non-heat-conducting material, and diffusing, dissipating, or conducting the heat from the heated part or parts of the circuit.

32. The method of electric cooling or freezing, consisting in establishing an electric circuit having one or more parts adapted to be cooled and one or more parts adapted to be heated by the electric current, locating the part or parts adapted to be cooled in proximity to a receptacle to be cooled, inclosing the said receptacle and cooled part or parts in a suitable inclosure, and diffusing, dissipating, or conducting the heat from the heated part or parts of the circuit.

33. The method of electric cooling or freezing, consisting in establishing an electric circuit having one or more parts adapted to be cooled and locating said part or parts in proximity to a receptacle to cool the same.

34. The method of electrically changing temperature, consisting in subjecting a medium to a changing effect produced by a current in one or more parts of an electric circuit, and circulating said medium through a conduit or pipe leading to a locality whereat the temperature is to be changed.

35. The method of electrically changing temperature, consisting in subjecting a medium to a changing effect produced by a continuous current in one or more parts of an electric circuit, and circulating said medium through a conduit or pipe leading to and from a locality whereat the temperature is to be changed.

36. The method of electrically changing temperature, consisting in subjecting a medium to a changing effect produced by a current in one or more parts of an elecric circuit, and simultaneously therewith circulating said medium through a conduit or pipe leading to and from a locality whereat the temperature is to be changed.

37. The method of producing a change of temperature electrically, consisting in subjecting a medium contained in a receptacle or reservoir to a changing effect of a current in one or more parts of an electric circuit, and simultaneously therewith circulating said medium through a conduit or pipe leading from and to the reservoir and through the locality whereat the temperature is to be changed.

38. The method of producing a change of temperature electrically, consisting in subjecting a medium contained in a non-heat-conducting receptacle or reservoir to a changing effect of a current in one or more parts of an electric circuit, and simultaneously therewith circulating said medium through a conduit or pipe leading from and to the reservoir and through the locality whereat the temperature is to be changed.

39. The method of producing a change of temperature electrically, consisting in subjecting a liquid contained in a receptacle or reservoir to a changing effect of a current in one or more parts of an electric circuit, and simultaneously therewith circulating said liquid through a conduit or pipe leading from and to the reservoir and through the locality wherein the temperature is to be changed.

40. The method of cooling or freezing, consisting in removing heat from a medium by or through the convection or conduction of heat produced by electricity and circulating or passing said medium through a locality to be cooled.

41. The method of cooling or freezing, consisting in removing heat from an uncongealable medium by or through the convection or conduction of heat produced by electricity, and circulating or passing said medium through a locality to be cooled.

42. The method of electrically changing temperature, consisting in removing heat from or disengaging heat in a medium by or through the convection or conduction of heat produced by an electric current or currents, and circulating or passing said medium through a locality wherein the temperature is to be changed.

In testimony whereof I have hereunto signed my name this 12th day of November, 1889.

MARK W. DEWEY. [L. S.]

Witnesses:
C. H. DUELL,
C. L. BENDIXON.